United States Patent
Liu

(10) Patent No.: US 9,615,398 B2
(45) Date of Patent: Apr. 4, 2017

(54) METHOD FOR ESTABLISHING X2 CONNECTION BETWEEN BASE STATIONS, BASE STATION, AND COMMUNICATION SYSTEM

(71) Applicant: HUAWEI TECHNOLOGIES CO., LTD., Shenzhen (CN)

(72) Inventor: Tao Liu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 48 days.

(21) Appl. No.: 14/149,287

(22) Filed: Jan. 7, 2014

(65) Prior Publication Data

US 2014/0120927 A1 May 1, 2014

Related U.S. Application Data

(63) Continuation of application No. PCT/CN2011/077091, filed on Jul. 13, 2011.

(51) Int. Cl.
*H04W 84/18* (2009.01)
*H04W 92/20* (2009.01)
(Continued)

(52) U.S. Cl.
CPC .......... *H04W 84/18* (2013.01); *H04W 24/02* (2013.01); *H04W 72/0426* (2013.01); *H04W 76/02* (2013.01); *H04W 92/20* (2013.01)

(58) Field of Classification Search
CPC . H04L 61/103; H04L 61/6095; H04L 63/061; H04W 12/04; H04W 24/02;
(Continued)

(56) References Cited

U.S. PATENT DOCUMENTS 8,520,636 B2 * 8/2013 Xu .......................... H04L 63/061
370/331
8,768,376 B2 * 7/2014 Sun .................... H04W 36/0061
455/456.1
(Continued)

FOREIGN PATENT DOCUMENTS

CN 101854633 A 10/2010
CN 101877871 A 11/2010
(Continued)

OTHER PUBLICATIONS

3GPP, 3rd Generation Partnership Project; S1 Application Protocol, Mar. 2011, 3GPPTS36.413 v. 10.1.0, pp. 51, 87 and 131.*

(Continued)

*Primary Examiner* — Matthew Sams
(74) *Attorney, Agent, or Firm* — Staas & Halsey LLP

(57) ABSTRACT

An embodiment of the present invention provides a method for establishing an X2 connection between base stations, including: obtaining, by a base station, a cell identifier of a neighboring base station through a self-organized network SON receiver; obtaining, by the base station, according to the cell identifier, address information of the neighboring base station; and establishing, by the base station, an X2 connection with the neighboring base station according to the address information of the neighboring base station, and thereby implementing fast optimization of a network.

16 Claims, 2 Drawing Sheets

(51) Int. Cl.
*H04W 76/02* (2009.01)
*H04W 72/04* (2009.01)
*H04W 24/02* (2009.01)

(58) Field of Classification Search
CPC ............. H04W 36/0038; H04W 76/02; H04W 76/025; H04W 8/26; H04W 92/20
See application file for complete search history.

(56) References Cited

U.S. PATENT DOCUMENTS

| | | | | |
|---|---|---|---|---|
| 8,861,494 | B2* | 10/2014 | Mukhopadhyay | .... H04W 4/001 370/338 |
| 2009/0042597 | A1 | 2/2009 | Yuuki | |
| 2009/0252132 | A1* | 10/2009 | Song | ........ H04W 76/025 370/338 |
| 2009/0264130 | A1 | 10/2009 | Catovic et al. | |
| 2010/0008293 | A1* | 1/2010 | Gupta | ........ H04W 92/20 370/328 |
| 2010/0039991 | A1* | 2/2010 | Godin | ........ H04W 24/02 370/328 |
| 2011/0059744 | A1* | 3/2011 | Won | ........ H04W 8/26 455/450 |
| 2011/0141972 | A1 | 6/2011 | Oh et al. | |
| 2011/0143743 | A1* | 6/2011 | Pollakowski | ........ H04L 41/082 455/422.1 |
| 2011/0269471 | A1 | 11/2011 | Gao | ........ 455/437 |
| 2012/0015683 | A1* | 1/2012 | Gao | ........ H04W 8/26 455/524 |
| 2012/0100852 | A1* | 4/2012 | Horn | ........ H04W 36/0055 455/436 |
| 2012/0196617 | A1* | 8/2012 | Sun | ........ H04W 36/0061 455/456.1 |
| 2012/0263096 | A1* | 10/2012 | Masini | ........ H04W 36/10 370/315 |
| 2012/0307697 | A1* | 12/2012 | Mukhopadhyay | .... H04W 4/001 370/311 |
| 2014/0120927 | A1* | 5/2014 | Liu | ........ H04W 76/02 455/450 |

FOREIGN PATENT DOCUMENTS

| | | |
|---|---|---|
| CN | 101888622 A | 11/2010 |
| EP | 2214452 A1 | 8/2010 |
| EP | 2427029 A1 | 3/2012 |
| JP | 2009-44336 | 2/2009 |
| JP | 2011-130354 | 6/2011 |
| JP | 2011-518531 | 6/2011 |
| JP | 2011-519505 | 7/2011 |
| JP | 2012-525742 | 10/2012 |
| KR | 10-2011-0068018 | 6/2011 |
| KR | 10-2011-0069872 | 6/2011 |
| WO | 2009/066337 A1 | 5/2009 |
| WO | 2009/120127 A1 | 10/2009 |
| WO | 2010/078676 A1 | 7/2010 |
| WO | 2011/020335 A1 | 2/2011 |

OTHER PUBLICATIONS

International Search Report issued Apr. 5, 2012, in corresponding International Patent Application No. PCT/CN2011/077091.
Chinese Office Action issued Feb. 5, 2013, in corresponding Chinese Patent Application No. 201180001136.9.
International Search Report mailed Apr. 5, 2012 in corresponding International Application No. PCT/CN2011/077091.
Japanese Office Action dated Dec. 19, 2014 in corresponding Japanese Patent Application No. 2014-519371.
Korean Office Action dated Dec. 31, 2014 in corresponding Korean Patent Application No. 10-2014-7000526.
Korean Notice of Allowance dated Oct. 27, 2015 in corresponding Korean Patent Application No. 10-2014-7000526.

* cited by examiner

METHOD FOR ESTABLISHING X2 CONNECTION BETWEEN BASE STATIONS, BASE STATION, AND COMMUNICATION SYSTEM

CROSS-REFERENCE TO RELATED APPLICATIONS

This application is a continuation of International Application No. PCT/CN2011/077091, filed on Jul. 13, 2011, which is hereby incorporated by reference in its entirety.

FIELD

Embodiments of the present invention relate to the field of mobile communication technologies, and in particular, to a method for establishing an X2 connection between base stations, a base station, and a communication system.

BACKGROUND

A 3GPP long term evolution system (Long Term Evolution, hereinafter abbreviated as LTE) is a promising mobile communication system. It originates from a traditional universal mobile telecommunications system (Universal Mobile Telecommunications System, UMTS) network, and can provide a higher radio access rate and a better service support.

On an LTE network, a base station and a neighboring base station of the base station can establish an X2 connection through an X2 interface to facilitate mutual communications or implement data transmissions. The neighboring base station may be a neighboring base station that imposes interference on communications of the base station, and the base station may also be a base station that imposes interference on communications of the neighboring base station. For example, interference information between the base station and the neighboring base station can be transferred through an X2 connection between base stations, where the interference information may be used for the base station or the neighboring base station to adjust a communication policy of the base station or the neighboring base station to improve an anti-interference ability of the base station or the neighboring base station, thereby implementing network optimization.

In the prior art, an X2 connection between the base station and the neighboring base station can be implemented by using a manual configuration mode. Alternatively, an X2 connection between the base station and the neighboring base station may be triggered by using a specific method and then be generated by the LTE system automatically. This mode of generating an X2 connection automatically by the LTE system may be called a mode of establishing an X2 connection automatically.

For example, the foregoing mode of establishing an X2 connection automatically may be as follows: A user equipment (User Equipment, hereinafter abbreviated as UE) reports related information of the neighboring base station to the base station to establish an X2 connection between the base station and the neighboring base station, so that communications between the base station and the neighboring base station are implemented. The foregoing mode of establishing an X2 connection between base stations automatically is more and more widely used because it can greatly reduce operation and maintenance workloads on the base station or the neighboring base station.

However, the mode of establishing an X2 connection between base stations automatically based on report of the UE needs to rely on access and mobility of the UE for implementation. For example, in the mode of establishing an X2 connection between base station automatically, UEs at different positions in a cell under the base station or sufficient UEs in the cell are required to report related information of the neighboring base station to the base station, so that an X2 connection is gradually established between the base station and the neighboring base station. When there is no UE in the cell or there are insufficient UEs in the cell or there are no UEs at different positions in the cell, the base station and the neighboring base station cannot establish an X2 connection automatically or cannot establish a perfect X2 connection, so that communications between the base station and the neighboring base station cannot be implemented, thereby making it difficult to implement fast optimization of a network.

SUMMARY

The present invention provides a method for establishing an X2 connection between base stations, a base station, and a communication system to solve a problem that when there is no UE or there are insufficient UEs or there are no UEs at different positions, a base station and a neighboring base station cannot establish an X2 connection automatically or cannot establish a perfect X2 connection and therefore communications between the base station and the neighboring base station cannot be implemented and fast optimization of a network is difficult to implement.

One aspect of the present invention provides a method for establishing an X2 connection between base stations, including:

obtaining, by a base station, a cell identifier of a neighboring base station through a self-organized network SON receiver;

obtaining, by the base station, address information of the neighboring base station according to the cell identifier; and establishing, by the base station, an X2 connection with the neighboring base station according to the address information of the neighboring base station.

Another aspect of the present invention provides a base station, including:

a self-organized network SON receiver, configured to obtain a cell identifier of a neighboring base station;

an obtaining unit, configured to obtain address information of the neighboring base station according to the cell identifier; and a connecting unit, configured to establish an X2 connection with the neighboring base station according to the address information of the neighboring base station.

Another aspect of the present invention provides a communication system, including:

a base station and a self-organized network SON receiver;

where the self-organized network SON receiver is configured to obtain a cell identifier of a neighboring base station; and the base station is configured to obtain address information of the neighboring base station according to the cell identifier, and establish an X2 connection with the neighboring base station according to the address information of the neighboring base station.

Another aspect of the present invention provides a communication system, including:

a base station and an intermediate network element;

where the base station is configured to obtain a cell identifier of a neighboring base station through a self-organized network SON receiver, obtain an identifier of the neighboring base station according to the cell identifier, and send the identifier of the neighboring base station to the intermediate network element; and the intermediate network element is configured to obtain address information of the neighboring base station according to the identifier of the neighboring base station, and send the address information of the neighboring base station to the base station;

where the base station establishes an X2 connection with the neighboring base station according to the address information of the neighboring base station.

The method for establishing an X2 connection between base stations, the base station, and the communication system of the present invention are used to overcome defects of establishing an X2 connection between base stations based on report of a UE, such as slow speed and slow network optimization, so that an X2 connection between a base station and a neighboring base station does not rely on access of the UE and an X2 connection can be quickly established between the base station and the neighboring base station, thereby implementing fast optimization of a network.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Persons skilled in the art can understand that the accompanying drawings are schematic diagrams of only one exemplary embodiment, and modules and processes in the accompanying drawings may not be necessarily required for implementing the present invention.

In the LTE system, to support automatic configuration and adjustment, corresponding parameters need to be interacted between different network elements, while corresponding processing needs to be implemented inside each network element. These functions may be implemented by using a self-organized network (Self-Organized Network, hereinafter abbreviated as SON) technology.

The SON technology has such main characteristics as automatic configuration, automatic discovery, automatic organization, and multi-hop route. The characteristics of automatic configuration and automatic discovery of the SON technology make a process of forming a network by radio devices transparent to a terminal device. In the case of change in a network topology and link disconnection, the characteristics of automatic healing and automatic organization of the SON technology also enhance robustness of a mobile network. In addition, the SON technology can also ensure optimization of bandwidth usage effectiveness. The present invention mainly uses the characteristics of the SON technology. By using an SON receiver that has the characteristics of the SON technology, a base station obtains related information of a neighboring base station to establish an X2 connection between the base station and the neighboring base station quickly, thereby implementing fast optimization of the network.

The present invention is hereinafter described in detail with reference to different embodiments.

Figure 1:
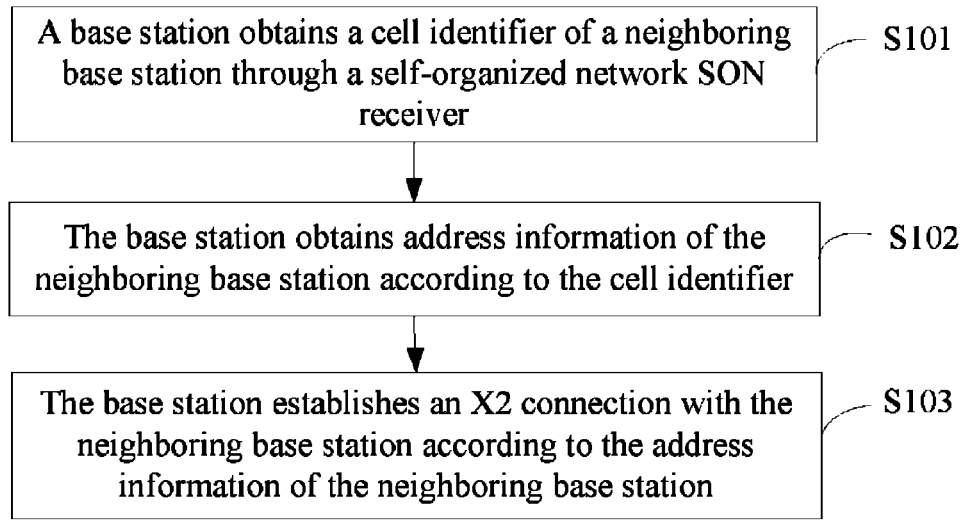
FIG. 1 is a flowchart of a method for establishing an X2 connection between base stations according to a first embodiment of the present invention.

As shown in FIG. 1, a method for establishing an X2 connection between base stations according to a first embodiment of the present invention includes the following steps:

S101. A base station obtains a cell identifier of a neighboring base station through a self-organized network SON receiver.

S102. The base station obtains address information of the neighboring base station according to the cell identifier.

S103. The base station establishes an X2 connection with the neighboring base station according to the address information of the neighboring base station.

In S101, the SON receiver may be located inside the base station. For example, in the base station, the SON receiver may be configured by installing an integrated chip, a software module, or hardware module. In another example, in the base station, installation parameters may be set to perform configuration on the SON receiver. The SON receiver may also be located outside the base station. For example, the SON receiver can establish a connection with the base station through a universal serial bus (Universal Serial Bus, abbreviated as USB) or through a serial port (for example, an RS232 serial port used for remote communications) or through the Ethernet. Persons skilled in the art can understand and implement the foregoing configuration mode of the SON receiver, and details are not further described herein.

In this embodiment, the cell identifier of the neighboring base station may be a cell global identifier (Cell Global ID, hereinafter abbreviated as CGI) of a cell under the neighboring base station.

Generally, one neighboring base station corresponds to one or more cells, and each cell has a unique CGI. For example, the foregoing neighboring base station may be a micro base station and correspond to one cell. Alternatively, the foregoing neighboring base station may be a macro base station and correspond to multiple cells. During configuration of the CGI, the neighboring base station can configure a CGI for each cell under the neighboring base station, and send a CGI to a cell corresponding to the CGI. The neighboring base station may also send a CGI corresponding to a cell to a mobility management entity (Mobility Management Entity, hereinafter abbreviated as MME), to ensure that the cell under the neighboring base station, the neighboring base station, and the mobility management entity have the unique CGI corresponding to the cell.

In this embodiment, the SON receiver receives indication information, and obtains the cell global identifier in working mode specified by the indication information. The working mode may be a working frequency point and a working standard of the SON receiver.

Specifically, after the base station is powered on, a communication channel between the base station and a network management system is established automatically. For example, the communication channel between the base station and the network management system is established automatically by using the SON technology. The network management system can perform remote management control on the base station, for example, the network management system implements remote control on the base station through an intelligent platform management interface (Intelligent Platform Management Interface, hereinafter abbreviated as IPMI).

After the communication channel between the base station and the network management system have been established automatically, the network management system sends indication information to the SON receiver, where the indication information may include such information as the working frequency point and the working standard of the SON receiver. For example, the working frequency point may be a working frequency allocated by the base station to the SON receiver and used to receive and send data. In another example, the working standard may be a working mode of a radio access system defined by the 3GPP, for example, an LTE, a wideband code division multiple access (Wideband Code Division Multiple Access, abbreviated as WCDMA), a global system for mobile communications (abbreviated as GSM), and the like. In this embodiment, the working standard of the SON receiver is the LTE system. In the working frequency point and the LTE system allocated by the base station, the SON receiver starts running and further obtains a CGI of the neighboring base station.

In this embodiment, the SON receiver may also obtain, in the foregoing working frequency point and working standard, a physical cell identifier (Physical Cell Identifier, hereinafter abbreviated as PCI) of a cell under the neighboring base station, and obtain the CGI according to the PCI. The PCI is one of parameters used by the LTE system to perform scrambling processing on a downlink signal, and has the following functions:

enabling the UE to differentiate signals sent from different cells;

randomizing interference on different cells; and assisting the related measurement and report processes when the UE performs cell reselection or handover.

To enable the PCI to have the foregoing functions, two constraints are generally imposed on the PCI: One is no conflict, indicating that neighboring cells have different PCIs; if the neighboring cells have a same PCI, a severe interference may occur between the neighboring cells. The other is no confusion, indicating that neighboring cells of any one cell are not allowed to use a same PCI. The foregoing neighboring cells may be considered cells with overlapped signal coverage.

In this embodiment, multiple cells in the neighboring base station may be allocated different CGIs and neighboring cells have different PCIs. For example, a mapping relationship among the CGI, the PCI, and each cell is stored on the access network side, and the SON receiver can obtain, according to the mapping relationship, a CGI by using the PCI. Persons skilled in the art can understand and implement obtaining a CGI by using a PCI according to a predetermined mode, and details are not further described herein.

S102 in this embodiment may be detailed as follows:

The base station obtains an identifier of the neighboring base station according to the cell identifier.

The base station obtains the address information of the neighboring base station according to the identifier of the neighboring base station.

In this embodiment, the identifier of the neighboring base station may be related information of the neighboring base station, for example, an identifier ID of the neighboring base station. In this embodiment, a field of the CGI includes the identifier ID of the neighboring base station, and the base station can obtain the identifier ID of the neighboring base station according to the CGI. Persons skilled in the art can understand and implement obtaining the identifier ID of the neighboring base station according to the CGI, and details are not further described herein.

In this embodiment, the SON receiver sends an obtained CGI to a base station, and the base station maintains and updates, according to the CGI, an information list of the neighboring base station located inside the base station. The information list of the neighboring base station includes related information of the neighboring base station. For example, the information list may include a CGI of a cell under the neighboring base station, a name of the neighboring base station, and an identifier ID of the neighboring base station. Persons skilled in the art know that related information of the neighboring base station in the information list may be any information so long as the address information of the neighboring base station can be obtained according to the related information, and details are not further described herein In this embodiment, the address information of the neighboring base station may be transport layer address information. The transport layer address information may be complete transport layer address information, or be one part of the complete transport layer address information so long as the base station can uniquely identify the transport layer address information and establish an X2 connection with the neighboring base station through the transport layer address information. For example, the transport layer address information may be transport layer address information of an X2 interface, and the base station can establish an X2 connection with the neighboring base station according to the transport layer address information of the X2 interface. In another example, the transport layer address information may be Internet Protocol (Internet Protocol, hereinafter abbreviated as IP) address information of the neighboring base station, and the base station can initiate, according to the IP address information of the neighboring base station, an instruction for establishing an X2 connection with the neighboring base station to the neighboring base station. Persons skilled in the art can understand that the transport layer address information may also include other contents, and details are not further described herein.

S102 in this embodiment may also be detailed as follows:

The base station sends the identifier of the neighboring base station to an intermediate network element.

The base station receives the address information of the neighboring base station that is obtained according to the identifier of the neighboring base station by the intermediate network element.

In this embodiment, the intermediate network element can store address information of a target base station used to establish an X2 connection between the base station and the neighboring base station. For example, the intermediate network element has an information list or a storage unit, and the information list or the storage unit has a mapping relationship between the identifier of the neighboring base station and the address information of the neighboring base station. In this case, the intermediate network element can obtain the address information of the neighboring base station directly by querying the information list or the storage unit, and feed back the address information of the neighboring base station to the base station. For example, the intermediate network element can obtain the IP address information of the neighboring base station by querying the information list or the storage unit. In another example, the intermediate network element may also obtain the transport layer address information of the X2 interface by querying the information list or the storage unit.

In this embodiment, the intermediate network element may be an MME or a network management system.

In S103, the mode of establishing an X2 connection with the neighboring base station by the base station according to the address information of the neighboring base station is exemplified as follows:

For example, after the base station obtains the IP address information of the neighboring base station, the base station can send an X2 connection establishment message to the neighboring base station. After receiving the X2 connection establishment message, the neighboring base station parses the X2 connection establishment message, and performs processing according to an X2 connection establishment request included in the X2 connection establishment message to implement an X2 connection between the base station and the neighboring base station.

In another example, the X2 connection establishment message sent by the base station to the neighboring base station includes the IP address information of the base station. After receiving the X2 connection establishment message, the neighboring base station implements an X2 connection with the base station according to the IP address information of the base station.

In another example, after the neighboring base station receives the X2 connection establishment message from the base station, if the neighboring base station is required to feed back a response message of the X2 connection establishment message to the base station to implement an X2 connection between the base station and the neighboring base station, the neighboring base station sends a response message to the base station according to the IP address of the base station in the X2 connection establishment message. After parsing the response message, the base station knows that the neighboring base station has already been prepared for the X2 connection. In this case, the base station can implement an X2 connection with the neighboring base station.

In this embodiment, how to determine a range of the neighboring base station depends on different implementation policies. For example, the base station can initiate, according to a fact that requirements of an operator are set in the network management system, a request for obtaining the address information of the neighboring base station with respect to the neighboring base station. In another example, the base station can know topology information of a position of the base station according to the MME, so that the base station sets the range of the neighboring base station. In another example, all base stations in a predetermined area may be used as the neighboring base station range of the base station according to the predetermined area.

Therefore, in the embodiment of the present invention, a base station can obtain address information of a neighboring base station through an SON receiver, so that an X2 connection between the base station and the neighboring base station does not rely on access of a UE and an X2 connection can be quickly established between the base station and the neighboring base station, thereby implementing fast optimization of a network.

Persons skilled in the art can understand that all or a part of the steps in the foregoing method embodiments may be implemented by related hardware instructed by a program. The program may be stored in a computer readable storage medium. When the program runs, the steps of the foregoing method embodiments are performed. The storage medium may include various mediums that can store program code, such as a ROM, a RAM, a magnetic disk, or an optical disc.

Figure 2:
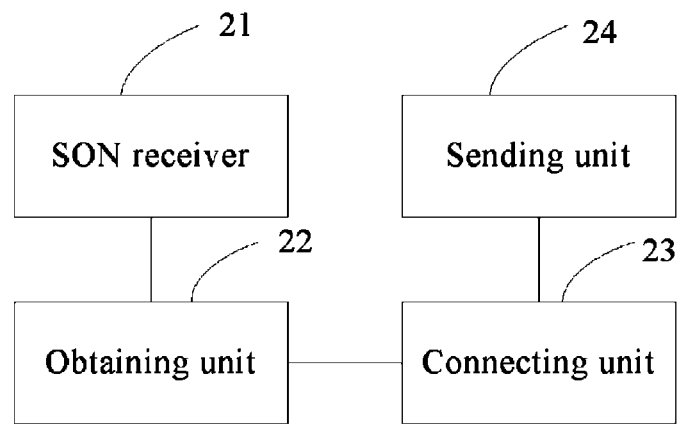
FIG. 2 is a schematic structural diagram of a base station according to a second embodiment of the present invention.

FIG. 2 illustrates a base station provided by a second embodiment of the present invention, where the base station is configured to implement actions executed by the base station in the method for establishing a connection between network elements in the foregoing embodiment.

The base station includes:

an SON receiver 21, configured to obtain a cell identifier of a neighboring base station;

an obtaining unit 22, configured to obtain address information of the neighboring base station according to the cell identifier; and a connecting unit 23, configured to establish an X2 connection with the neighboring base station according to the address information of the neighboring base station.

For example, the obtaining unit 22 is further configured to obtain an identifier of the neighboring base station according to the cell identifier, and obtain the address information of the neighboring base station according to the identifier of the neighboring base station.

For example, the SON receiver 21 is further configured to obtain indication information, and obtain the cell identifier in working mode specified by the indication information.

For example, the base station further includes a sending unit 24 configured to send the identifier of the neighboring base station to an intermediate network element.

For example, the obtaining unit 22 is further configured to receive the address information of the neighboring base station that is obtained according to the identifier of the neighboring base station by the intermediate network element.

Persons skilled in the art can understand that for specific functions and effects implemented by each device of the base station, reference may be made to the embodiment illustrated in FIG. 1, and details are not further described herein.

Therefore, in the embodiment of the present invention, a base station can obtain address information of a neighboring base station through an SON receiver, so that an X2 connection between the base station and the neighboring base station does not rely on access of a UE and an X2 connection can be quickly established between the base station and the neighboring base station, thereby implementing fast optimization of a network.

Figure 3:
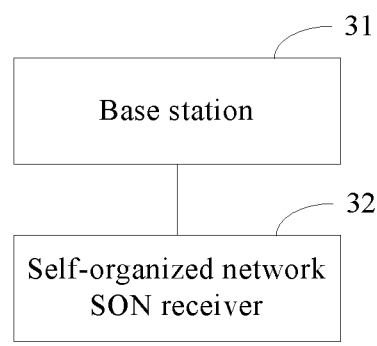
FIG. 3 is a schematic structural diagram of a communication system according to a third embodiment of the present invention.

FIG. 3 illustrates a communication system provided in a third embodiment of the present invention, where the communication system is configured to implement the method for establishing an X2 connection between base stations in the foregoing embodiment.

The communication system includes:

a base station 31 and a self-organized network SON receiver 32;

where the self-organized network SON receiver 32 is configured to obtain a cell identifier of a neighboring base station; and the base station 31 is configured to obtain address information of the neighboring base station according to the cell identifier and establish an X2 connection with the neighboring base station according to the address information of the neighboring base station.

For example, the base station 31 is further configured to obtain an identifier of the neighboring base station according to the cell identifier, and obtain the address information of the neighboring base station according to the identifier of the neighboring base station.

For example, the SON receiver 32 is further configured to receive indication information, and obtain the cell identifier in working mode specified by the indication information.

For example, the base station 31 is further configured to send the identifier of the neighboring base station to an intermediate network element, and receive the address information of the neighboring base station that is obtained according to the identifier of the neighboring base station by the intermediate network element.

Persons skilled in the art can understand that for specific functions and effects implemented by each device of the communication system, reference may be made to the embodiment illustrated in FIG. 1, and details are not further described herein.

Therefore, in the embodiment of the present invention, a base station can obtain address information of a neighboring base station through an SON receiver, so that an X2 connection between the base station and the neighboring base station does not rely on access of a UE and an X2 connection can be quickly established between the base station and the neighboring base station, thereby implementing fast optimization of a network.

Figure 4:
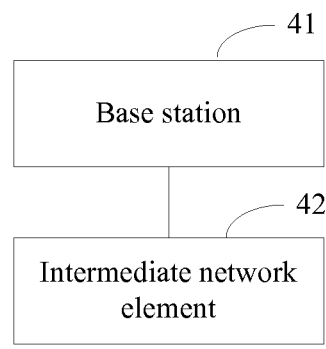
FIG. 4 is a schematic structural diagram of a communication system according to a fourth embodiment of the present invention.

FIG. 4 illustrates a communication system provided in a fourth embodiment of the present invention, where the communication system is configured to implement the method for establishing an X2 connection between base stations in the foregoing embodiment.

The communication system includes:

a base station 41 and an intermediate network element 42;

where the base station 41 is configured to obtain a cell identifier of a neighboring base station through a self-organized network SON receiver, obtain an identifier of the neighboring base station according to the cell identifier, and send the identifier of the neighboring base station to the intermediate network element 42; and the intermediate network element 42 is configured to obtain address information of the neighboring base station according to the identifier of the neighboring base station, and send the address information of the neighboring base station to the base station 41;

where the base station 41 establishes an X2 connection with the neighboring base station according to the address information of the neighboring base station.

For example, the intermediate network element is a mobility management entity or a network management system.

Persons skilled in the art can understand that for specific functions and effects implemented by each device of the communication system, reference may be made to the embodiment illustrated in FIG. 1, and details are not further described herein.

Therefore, in the embodiment of the present invention, a base station can obtain address information of a neighboring base station through an SON receiver, so that an X2 connection between the base station and the neighboring base station does not rely on access of a UE and an X2 connection can be quickly established between the base station and the neighboring base station, thereby implementing fast optimization of a network.

Persons skilled in the art can understand that modules in the device provided in the embodiment can be distributed in the device of the embodiment according to the description of the embodiment or be placed in one or more devices different from this embodiment through corresponding modifications. The modules of the foregoing embodiment may be combined into one module or be further split into multiple submodules.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as these modifications or replacements do not cause the essence of corresponding technical solutions to depart from the spirit and scope of the technical solutions of the embodiments of the present invention.

What is claimed is:

1. A method for establishing an X2 connection between base stations in a network, comprising:

obtaining, by a base station, a cell identifier of a neighboring base station through a self-organized network (SON) receiver of the base station, the SON receiver obtaining the cell identifier of the neighboring base station by other than reporting of a user equipment communicated and according to a mode specified by indication information received by the SON receiver for exchanging data via the network, the mode specified by the indication information being a working mode;

obtaining, by the base station, address information of the neighboring base station corresponding to the cell identifier by sending the cell identifier obtained through the SON receiver; and establishing, by the base station, an X2 connection with the neighboring base station according to the address information of the neighboring base station, wherein the SON receiver obtains the cell identifier while in the working mode specified by the indication information, and the working mode comprises a working frequency point and a working standard of the SON receiver.

2. The method for establishing an X2 connection between base stations according to claim 1, wherein:

the cell identifier is a cell global identifier or a physical cell identifier.

3. The method for establishing an X2 connection between base stations according to claim 1, wherein the obtaining, by the base station, the address information of the neighboring base station according to the cell identifier comprises:

obtaining, by the base station, an identifier of the neighboring base station according to the cell identifier; and obtaining, by the base station, the address information of the neighboring base station according to the identifier of the neighboring base station.

4. The method for establishing an X2 connection between base stations according to claim 3, wherein the base station sends the identifier of the neighboring base station to an intermediate network element; and the base station receives the address information of the neighboring base station that is obtained according to the identifier of the neighboring base station by the intermediate network element.

5. The method for establishing an X2 connection between base stations according to claim 4, wherein:
the intermediate network element is a mobility management entity or a network management system.

6. The method for establishing an X2 connection between base stations according to claim 1, wherein:
the address information of the neighboring base station is transport layer address information.

7. A base station, comprising:
a self-organized network (SON) receiver, configured to obtain a cell identifier of a neighboring base station, the cell identifier of the neighboring base station being obtained by other than reporting of a user equipment communicated and according to a mode specified by indication information received by the SON receiver for exchanging data using a network, the mode specified by the indication information being a working mode:
an obtaining unit, configured to obtain address information of the neighboring base station corresponding to the cell identifier by sending the cell identifier obtained through the SON receiver; and
a connecting unit, configured to establish an X2 connection with the neighboring base station according to the address information of the neighboring base station,
wherein the working mode comprises a working frequency point and a working standard of the SON receiver, and
the SON receiver is further configured to obtain the indication information, and obtain the cell identifier while in the working mode specified by the indication information.

8. The base station according to claim 7, wherein:
the obtaining unit is further configured to obtain an identifier of the neighboring base station according to the cell identifier, and obtain the address information of the neighboring base station according to the identifier of the neighboring base station.

9. The base station according to claim 8, further comprising: a sending unit, configured to send the identifier of the neighboring base station to an intermediate network element.

10. The base station according to claim 9, wherein: the obtaining unit is further configured to receive the address information of the neighboring base station that is obtained according to the identifier of the neighboring base station by the intermediate network element.

11. The base station according to claim 7, wherein:
the cell identifier is a cell global identifier or a physical cell identifier.

12. A communication system of a network, comprising:
a base station; and
a self-organized network (SON) receiver provided to the base station,
wherein the self-organized network SON receiver is configured to obtain a cell identifier of a neighboring base station, the cell identifier of the neighboring base station being obtained by other than reporting of a user equipment communicated and according to a mode specified by indication information received by the SON receiver for exchanging data via the network, the mode specified by the indication information is a working mode; and
the base station is configured to obtain address information of the neighboring base station corresponding to the cell identifier by sending the cell identifier obtained through the SON receiver, and establish an X2 connection with the neighboring base station according to the address information of the neighboring base station,
wherein the working mode comprises a working frequency point and a working standard of the SON receiver, and
the SON receiver is further configured to obtain the cell identifier while in the working mode specified by the indication information.

13. The communication system according to claim 12, wherein:
the base station is further configured to obtain an identifier of the neighboring base station according to the cell identifier, and obtain the address information of the neighboring base station according to the identifier of the neighboring base station.

14. The communication system according to claim 13, wherein: the base station is further configured to send the identifier of the neighboring base station to an intermediate network element, and receive the address information of the neighboring base station that is obtained according to the identifier of the neighboring base station by the intermediate network element.

15. A communication system of a network, comprising:
a base station, the base station being configured to:
obtain a cell identifier of a neighboring base station through a self-organized network (SON) receiver of the base station,
obtain an identifier of the neighboring base station corresponding to the cell identifier, and
send the identifier of the neighboring base station, the cell identifier of the neighboring base station being obtained by other than reporting of a user equipment communicated and according to a mode specified by indication information received by the SON receiver for exchanging data via the network, the mode specified by the indication information being a working mode; and
an intermediate network element, the intermediate network element being configured to:
obtain address information of the neighboring base station according to the cell identifier of the neighboring base station received from the SON receiver responsive to the base station sending the cell identifier obtained through the SON receiver to the intermediate network element, and
send the address information of the neighboring base station to the base station;
wherein the base station establishes an X2 connection with the neighboring base station according to the address information of the neighboring base station, the working mode comprises a working frequency point and a working standard of the SON receiver, and
the SON receiver is further configured to obtain the cell identifier while in the working mode specified by the indication information.

16. The communication system according to claim 15, wherein: the cell identifier is a cell global identifier or a physical cell identifier.

* * * * *